United States Patent [19]
Yoshimura et al.

[11] Patent Number: 5,317,510
[45] Date of Patent: May 31, 1994

[54] METHOD AND APPARATUS FOR GENERATING SENTENCES FROM CONCEPTUAL STRUCTURES

[75] Inventors: Yumiko Yoshimura, Kawasaki; Hideki Hirakawa; Yoshimi Asahioka, both of Yokohama; Mariko Kimura, Tokyo, all of Japan

[73] Assignee: Kabushiki Kaisha Toshiba, Kawasaki, Japan

[21] Appl. No.: 851,123

[22] Filed: Mar. 16, 1992

Related U.S. Application Data

[63] Continuation of Ser. No. 494,117, Mar. 14, 1990, abandoned.

[30] Foreign Application Priority Data

Mar. 15, 1989 [JP] Japan ................................ 1-63310

[51] Int. Cl.$^5$ .............................................. G06F 15/30
[52] U.S. Cl. .............................................. 364/419.08
[58] Field of Search ............... 364/419; 395/100, 149

[56] References Cited

U.S. PATENT DOCUMENTS 4,914,590 4/1990 Loatman et al. ................... 364/419

FOREIGN PATENT DOCUMENTS 0138619 4/1986 European Pat. Off. .
0201175 11/1983 Japan ............................ G06F 15/38
0201172 11/1984 Japan ............................ G06F 15/38

OTHER PUBLICATIONS

European Search Report, Application No. 90 10 4922.
Future Generations Computer System vol. 2, No. 2, Jun. 1986, pp. 125-139.
IBM Technical Disclosure Bulletin vol. 31, No. 5, Oct. 1988, pp. 407-408.
Yoshida, in *10th International Conference on Computational Linguistics*, on Jul. 2-6, 1984, Stanford University, California, pp. 167-169.
Amano et al., in *Machine Translation Summit*, Tokyo, Japan, 1989, pp. 107-112.
Uchida, in *Future Generations Computer Systems*, North-Holland, 1986, pp. 95-100.

*Primary Examiner*—Gail O. Hayes
*Attorney, Agent, or Firm*—Foley & Lardner

[57] ABSTRACT

A method and an apparatus for generating sentences capable of generating more natural and easily comprehensible sentences by incorporating the selection of an appropriate choice for the form of expression or the order of words from a number of possible candidates in a process of sentence construction. In the apparatus, conceptual structures to be utilized as elements of sentences to be generated are stored; rules to be followed in generating sentences are stored; and sentences are generated from the stored conceptual structures in accordance with the stored rules by utilizing sizes of partial structures of the conceptual structures specified by the stored rules to determine a sentence structure of the sentence to be generated.

22 Claims, 7 Drawing Sheets

FIG.5

| | [...ing....is good enough] |
|---|---|
| 1 | Pattern: *(subordinate-1) ⇒ *(subject-1, subjective complement-2)<br><br>Condition: the partial structure below the node 1 has no more than four nodes<br><br>Actions: the partial structure below the node 1 is put in a verbal form<br>a term "sufficient" is set for a new node 2<br>a term "be" is set for itself |
| 2 | Pattern: *(subordinate-1) ⇒ *(subject-1, subjective complement-2)<br><br>Condition: the partial structure below the node 1 has more than four nodes<br><br>Actions: the partial structure below the node 1 is put in an infinitive form<br>a term "what is needed" is set for a new node 2<br>a term "be" is set for itself |

FIG.7

```
⋮
objective {pw<8 | (without a relative clause of pw>6 & without a prepositional phrase of pw>6)} ,
objective complement,
objective,
⋮
```

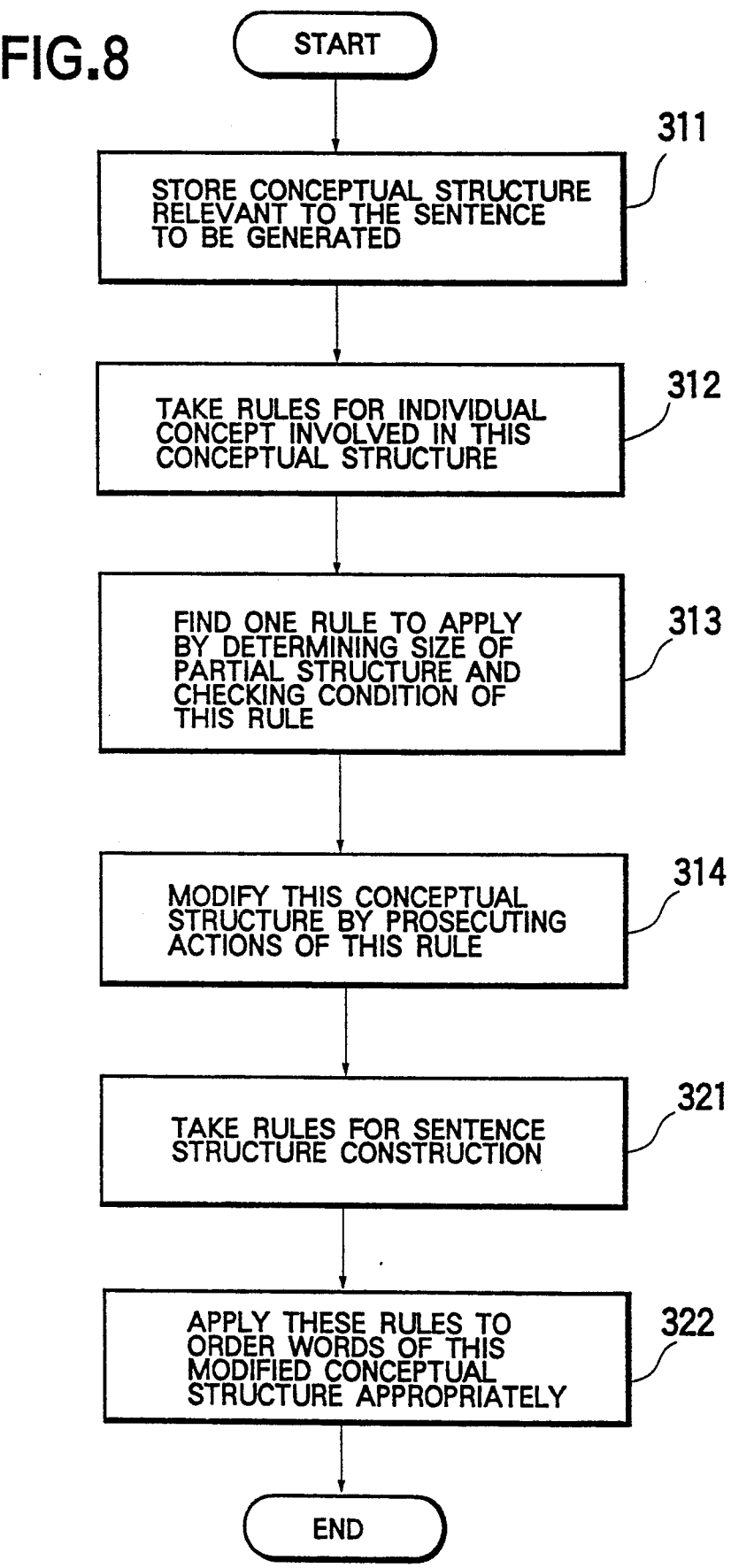

METHOD AND APPARATUS FOR GENERATING SENTENCES FROM CONCEPTUAL STRUCTURES

This application is a continuation of application Ser. No. 07/494,117, filed Mar. 14, 1990 now abandoned.

BACKGROUND OF THE INVENTION

1. Field of the Invention

The present invention relates to a method and an apparatus for generating sentences from given conceptual structures as elements of the sentences.

2. Description of the Background Art

In a conventional apparatus for generating sentences, a form of expression and order of words in a sentence to be generated are uniquely determined once the conceptual structures for the sentence matches with a certain prescribed pattern. For this reason, in generating a sentence, it has conventionally been impossible to select a form of expression which is suitable from a point of view of a balance of the sentence as a whole, out of a number of different forms of expressions having equivalent meanings.

As an example, consider a case of generating an English sentence from a concept ". . . ing . . . is good enough". In this case, two expressions "What is needed is to . . . " and ". . . ing . . . is sufficient" may be considered. Here, when a partial structure ". . . " is lengthy, the latter choice would result in a rather awkward sentence in which the subject is disproportionately large, so that the choice of the former would be preferable. On the contrary, when the partial structure ". . . " is short, the choice of the latter may be appropriate. However, this type of a choice of the form of expression has been impossible in the conventional apparatus for generating sentences.

As another example, consider a case of choosing an arrangement of the order of words. Namely, in English it is generally preferable to place a lengthy or complicated phrase toward the end of the sentence. Thus, for example a sentence "He had called the man on whose judgement he now had to rely an idiot." is rather awkward albeit grammatically correct. Alternate arrangement "He had called an idiot the man on whose judgement he now had to rely." would be less awkward and may be more preferable. Again, this type of a choice of the order of words has been impossible in the conventional apparatus for generating sentences.

It can be seen from these examples that, in order to be able to select an appropriate choice for the form of expression or the order of words from a number of possible candidates in a process of sentence construction, it is necessary to be able to assess a size of a partial structure of the sentence. However, the conventional apparatus for generating sentences has been impossible to incorporate such function, so that unnatural or awkward sentences have often been generated by the conventional apparatus for generating sentences.

SUMMARY OF THE INVENTION

It is therefore an object of the present invention to provide a method and an apparatus for generating sentences capable of generating more natural and easily comprehensible sentences by incorporating the selection of an appropriate choice for the form of expression or the order of words from a number of possible candidates in a process of sentence construction.

According to one aspect of the present invention there is provided an apparatus for generating sentences, comprising: conceptual structure storage means for storing conceptual structures to be utilized as elements of sentences to be generated; rule storage means for storing rules to be followed in generating sentences; and sentence generation means for generating sentences from the conceptual structures stored in the conceptual structure storage means in accordance with the rules stored in the rule storage means by utilizing sizes of partial structures of the conceptual structures specified by the rules stored in the rule storage means to determine a sentence structure of the sentence to be generated.

According to another aspect of the present invention there is provided a method of generating sentences, comprising the steps of: storing conceptual structures to be utilized as elements of sentences to be generated; storing rules to be followed in generating sentences; and generating sentences from the stored conceptual structures in accordance with the stored rules by utilizing sizes of partial structures of the conceptual structures specified by the stored rules to determine a sentence structure of the sentence to be generated.

Other features and advantages of the present invention will become apparent from the following description taken in conjunction with the accompanying drawings.

BRIEF DESCRIPTION OF THE DRAWINGS

FIG. 5 is an illustration of an example of rules for concepts to be used in the apparatus of FIG. 1.

FIG. 7 is an illustration of an example of rules for sentence constructions to be used in the apparatus of FIG. 1.

FIG. 8 is a detailed flow chart for the operation of the apparatus of FIG. 1.

DETAILED DESCRIPTION OF THE PREFERRED EMBODIMENTS

Figure 1:
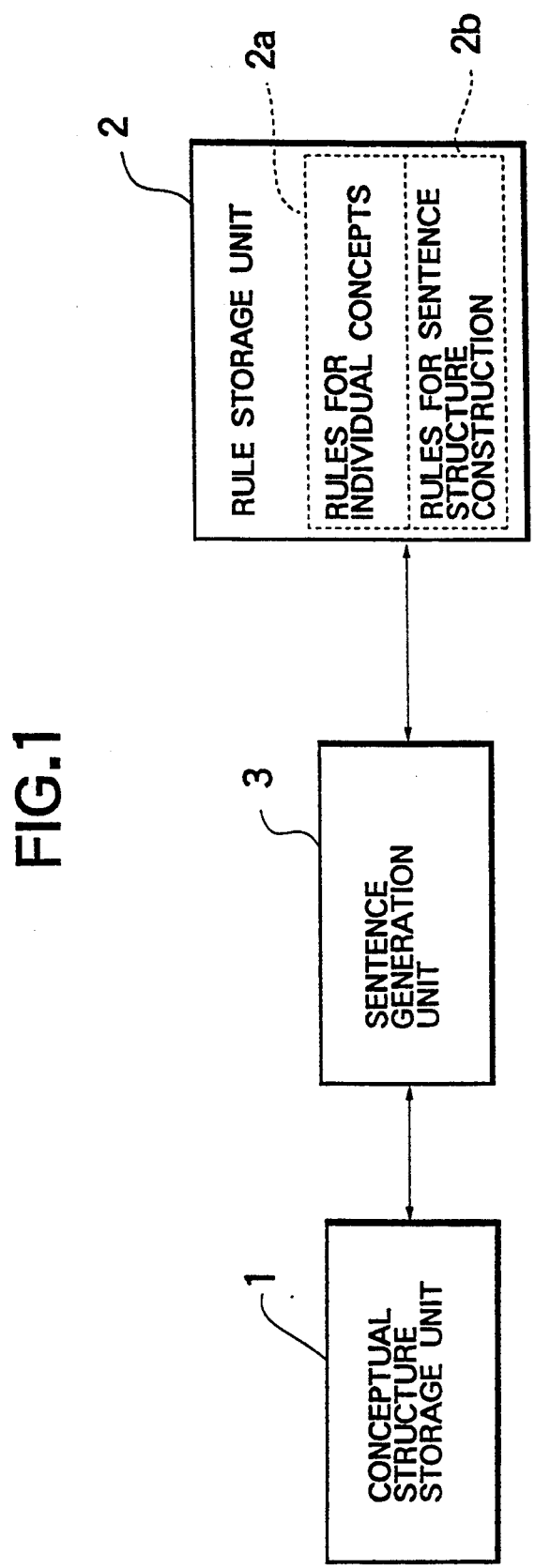
FIG. 1 is a schematic block diagram of one embodiment of an apparatus for generating sentences according to the present invention.

Referring now to FIG. 1, there is shown one embodiment of an apparatus for generating sentences according to the present invention.

In this embodiment, the apparatus comprises a conceptual structure storage unit 1 for storing conceptual structures to be utilized as elements of sentences to be generated, a rule storage unit 2 for storing rules to be followed in generating sentences which includes rules for individual concepts 2a and rules for sentence structure construction 2b, and a sentence generation unit 3 for generating sentences from the conceptual structures stored in the conceptual structure storage unit 1 in accordance with the rules stored in the rule storage unit 2. Contents of the conceptual structures and the rules will become apparent from the following description of examples of sentence generation.

Figure 2:
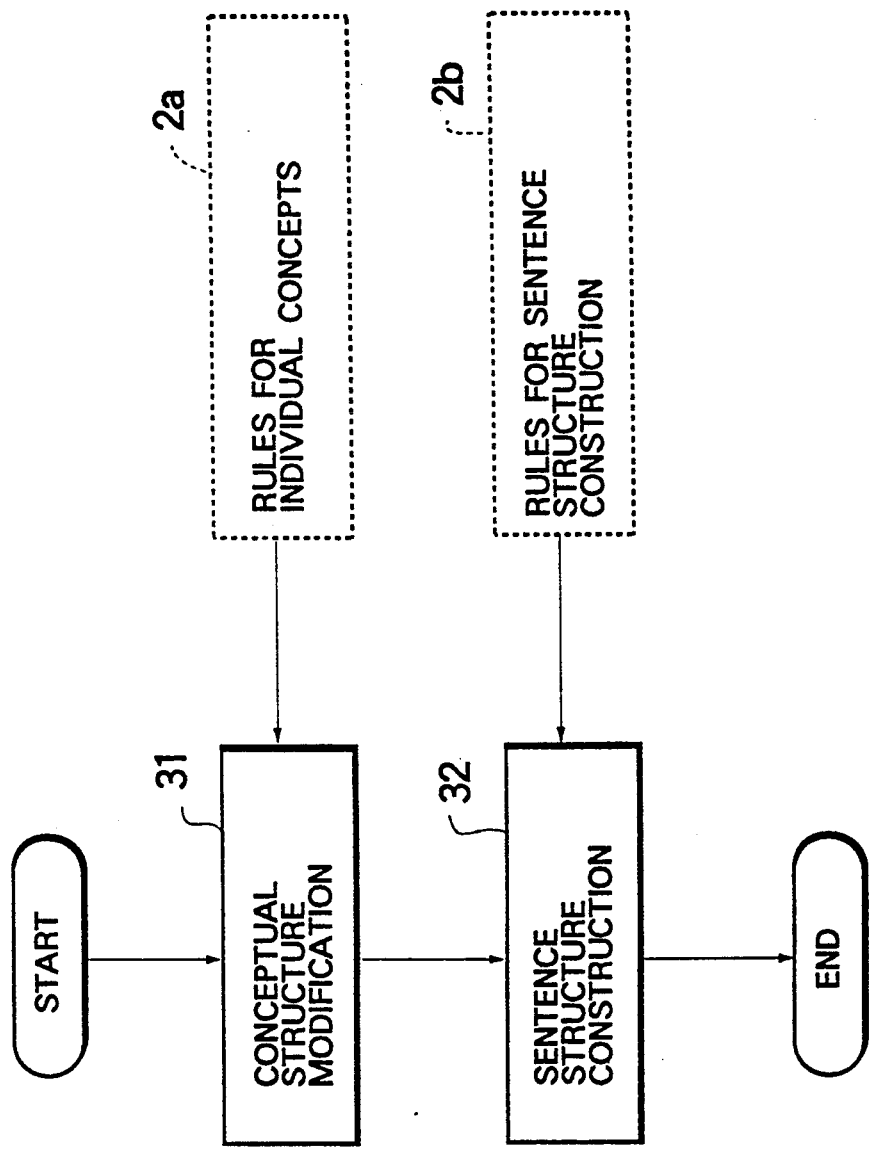
FIG. 2 is a schematic flow chart for the operation of the apparatus of FIG. 1.

In general, the sentence generation by this apparatus is performed in two steps of a flow chart of FIG. 2 as follows.

First, at a conceptual structure modification step 31, with respect to a particular conceptual structure relevant to the sentence to be generated which is stored in the conceptual structure storage unit 1, a sentence structure and words appropriate for a desirable form of expression for the particular conceptual structure relevant to the sentence to be generated are selected out by using the rules for individual concepts 2a, and the conceptual structure relevant to the sentence to be generated are modified according to the selected sentence structure and words.

Then, at a sentence structure construction step 32, an order of words are determined for the modified conceptual structure resulting from the conceptual structure modification step 31 in accordance with the rules for sentence structure construction 2b, so as to obtain the sentence as an ordered series of words.

In both of these steps 31 and 32, sizes of particular partial structures are utilized as keys for the selection and determination to be performed, which will now be described in detail by using examples of sentence generation.

Figure 3:
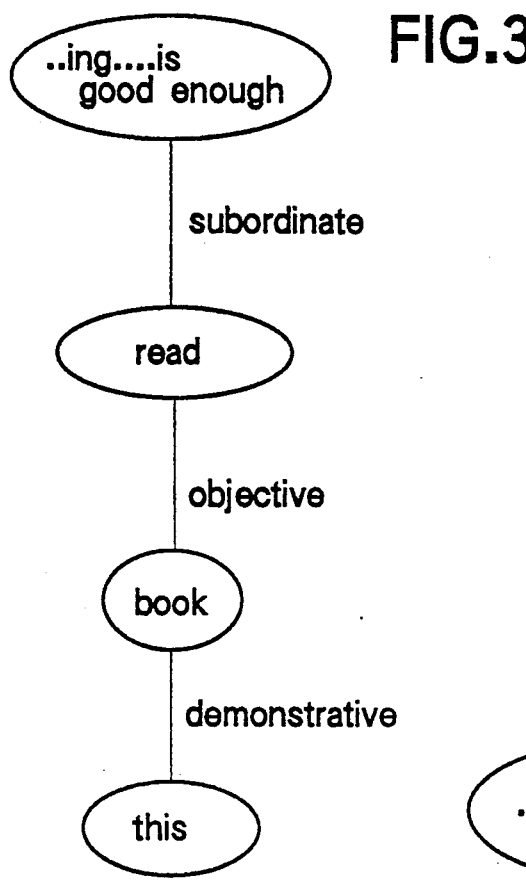
FIG. 3 is a tree diagram for conceptual structures of an example of sentence to be generated by the apparatus of FIG. 1.
Figure 4:
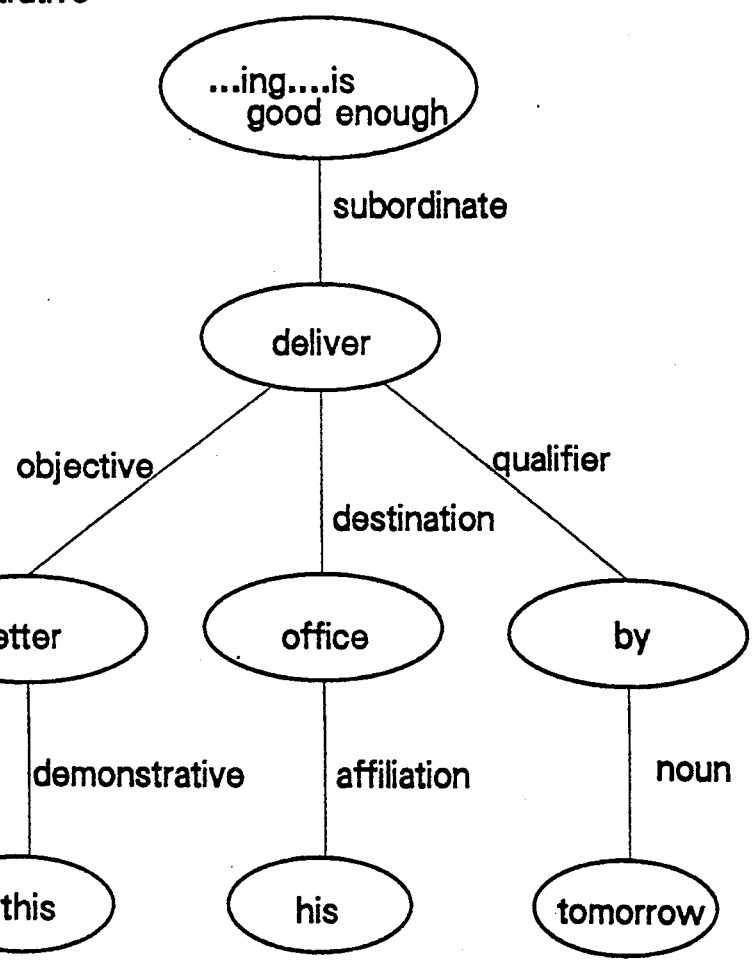
FIG. 4 is a tree diagram for conceptual structures of another example of sentence to be generated by the apparatus of FIG. 1.

First, the conceptual structure modification step 31 will be explained by using the specific conceptual structures "Reading this book is good enough" and "Delivering this letter to his office by tomorrow is good enough", which are shown diagrammatically in FIGS. 3 and 4, respectively. In FIGS. 3 and 4, each encircled entity will be referred to as a node, and nodes are labelled by integers increasing from top to bottom.

Now suppose that the specific rules shown in FIG. 5 are given for the specific concept of ". . . ing . . . is good enough". FIG. 5 shows two rules for this concept, where each rule comprises a pattern of modification to be applied appearing on a first line, a condition of applicability to be satisfied in applying this rule appearing on a second line, and actions to be taken when this rule is applied appearing on a third line and below. Thus, the rule 1 states that when the partial structure below a phrase ". . . ing . . . is good enough" (node 1) has no more than four nodes, a specific sentence structure ". . . ing . . . is sufficient" is selected and the conceptual structure will be modified by putting the partial structure below the node 1 in a verbal form, whereas the rule 2 states that when the partial structure below a phrase ". . . ing . . . is good enough" (node 1) has more than four nodes, a specific sentence structure "what is needed is to . . . " is selected and the conceptual structure will be modified by putting the partial structure below the node 1 in a infinitive form.

According to these rules, the conceptual structure "Reading this book is good enough" will be modified to "Reading this book is sufficient" since in this conceptual structure the partial structure below the node 1 has only three nodes "this", "book", and "read", so that the rule 1 applies. Similarly, the conceptual structure "Delivering this letter to his office by tomorrow is good enough" will be modified to "What is needed is to deliver this letter to his office by tomorrow" since in this conceptual structure the partial structure below the node 1 has seven nodes "tomorrow", "by", "this", "letter", "his", "office", and "deliver", so that the rule 2 applies.

Figure 6:
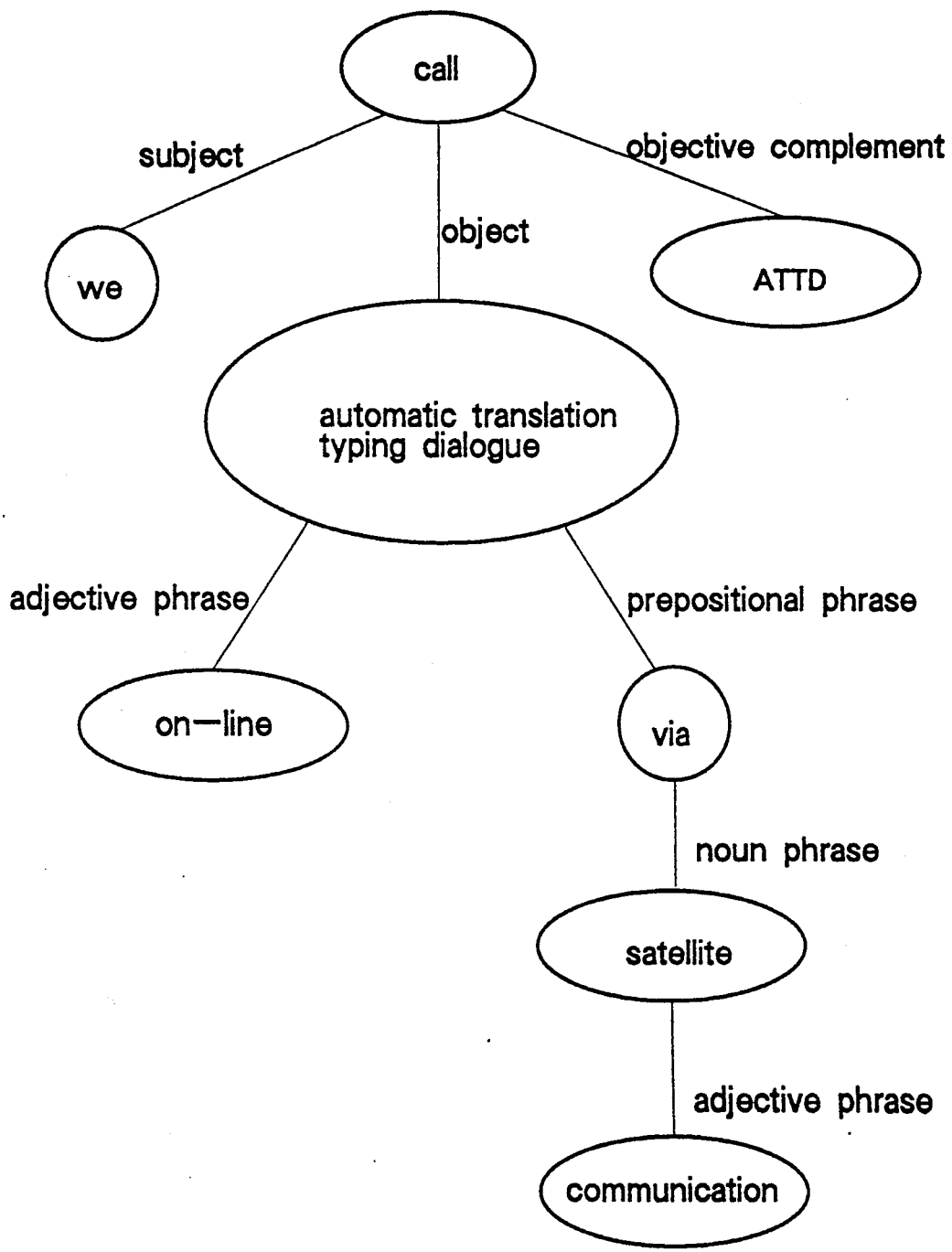
FIG. 6 is a tree diagram for conceptual structures of still another example of sentence to be generated by the apparatus of FIG. 1.

Next, the determination of the order of words at the sentence structure construction step 32 will be explained by using the specific conceptual structure "We call the on-line automatic translation typing dialogue via communication satellite ATTD" diagrammatically shown in FIG. 6 which is assumed to have resulted from the conceptual structure modification step 31. Here "automatic translation typing dialogue" is regarded as a single node.

Now suppose the specific rule shown in FIG. 7 is given as the rule for sentence structure construction. This rule concerns with the order of the objective and objective complement and specifies that such an objective which is either of less than 8 for weight value (pw), or, without a relative clause of more than 6 for weight value and a prepositional phrase of more than 6 for weight value, will be placed before the objective complement, while an objective not of the types enumerated above will be placed after the objective complement. Here, the weight value represents not a number of nodes involved but another quantity characterizing the partial structures such as a number of words involved, a number of letters involved, a number of syllables involved, a number of stressed syllables involved, a number of phonemes involved, or other similar quantities.

As an example, when the weight value is obtained as the number of words, the objective of this sentence is 8 because the single node "automatic translation typing dialogue" contains four words so that this node contributes 4 for the weight value, while each of four other nodes below this node contribute 1 for the weight value. As a consequence, in this case, the objective is placed after the objective complement according to the rule of FIG. 7, so that the sentence "We call ATTD the on-line automatic translation typing dialogue via communication satellite" will be generated, rather than a less desirable sentence "We call the on-line automatic translation typing dialogue via communication satellite ATTD".

Thus, the operation of the sentence generation by the apparatus of FIG. 1 can be summarized in a flow chart of FIG. 8 as follows.

When the sentence is to be generated, a conceptual structure relevant to the sentence to be generated is given to the conceptual structure storage unit 1 at the step 311.

Then, the sentence generation unit 3 takes the rules for the individual concept involved in this conceptual structure from the rule storage unit 2 at the step 312, finds one of the rules for which this conceptual structure satisfies the condition of applicability by determining the size of the partial structure specified in the rule and checking the condition of applicability specified in the rule at the step 313, and applies this rule to this conceptual structure so as to desirably modify this conceptual structure by prosecuting the actions specified by this rule at the step 314.

Then, after the modified conceptual structure is obtained, the sentence generation unit 3 takes the rules for sentence structure construction from the rule storage unit 2 at the step 321, and applies these rules to this modified conceptual structure so as to desirably order the words of this modified conceptual structure at the step 322.

As described, according to this embodiment, it is possible to provide a method and an apparatus for generating sentences capable of generating more natural and easily comprehensible sentences by incorporating the selection of an appropriate choice for the form of expression or the order of words from a number of possible candidates in a process of sentence construction, which is made possible in this embodiment by utilizing the size of the particular partial structures.

It is to be noted that although, in the above embodiment, the number of nodes and number of words are used as the sizes of the partial structures in the conceptual structure modification step 31 and the sentence structure construction step 32, respectively, the size of the partial structure in either step may be obtained as any quantity characterizing the partial structure such as a number of nodes involved, a number of words involved, a number of letters involved, a number of syllables involved, a number of stressed syllables involved, a number of phonemes involved, or other similar quantities.

It is also to be noted that the method and apparatus of the present invention may be adapted beneficially to a machine translation system, or a language processing system such as a summary generation system, a translation telephone system, or a question answering system.

Besides these, many modifications and variations of the above embodiments may be made without departing from the novel and advantageous features of the present invention. Accordingly, all such modifications and variations are intended to be included within the scope of the appended claims.

What is claimed is:

1. An apparatus for generating sentences, comprising:
   conceptual structure storage means for storing conceptual structures to be utilized as elements of sentences to be generated;
   rule storage means for storing rules to be followed in generating sentences; and
   sentence generation means for generating sentences from the conceptual structures stored in the conceptual structure storage means in accordance with the rules stored in the rule storage means by utilizing sizes of partial structures of the conceptual structures specified by the rules stored in the rule storage means to determine a sentence structure of each sentence to be generated.

2. The apparatus of claim 1, wherein the sizes of partial structures are given in terms of numbers of nodes contained in the partial structures.

3. The apparatus of claim 1, wherein the sizes of partial structures are given in terms of numbers of words contained in the partial structures.

4. The apparatus of claim 1, wherein the sizes of partial structures are given in terms of numbers of letters contained in the partial structures.

5. The apparatus of claim 1, wherein the sizes of partial structures are given in terms of numbers of syllables contained in the partial structures.

6. The apparatus of claim 1, wherein the sizes of partial structures are given in terms of numbers of stressed syllables contained in the partial structures.

7. The apparatus of claim 1, wherein the sizes of partial structures are given in terms of numbers of phonemes contained in the partial structures.

8. The apparatus of claim 1, wherein the sentence structure to be determined is an appropriate form of expression for the sentence to be generated.

9. The apparatus of claim 8, wherein the rules stored in the rule storage means includes rules for individual concept, each rule being specifying condition of applicability and actions to be prosecuted on the conceptual structures, and wherein the sentence generation means generates each sentence, on a basis of the conceptual structure relevant to the sentence to be generated stored in the conceptual structure storage means, by taking the rules for individual concept involved in this conceptual structure from the rule storage means, finding one of the rules for which this conceptual structure satisfies the condition of applicability by determining the size of the partial structure specified in the rule and checking the condition of applicability specified in the rule, and applying this rule to this conceptual structure so as to desirably modify this conceptual structure by prosecuting the actions specified by this rule.

10. The apparatus of claim 1, wherein the sentence structure to be determined is an appropriate order of words for the sentence to be generated.

11. The apparatus of claim 10, wherein the rules stored in the rule storage means includes rules for sentence structure construction specifying an order in which words of the conceptual structures are to be arranged, and wherein the sentence generation means generates each sentence, on a basis of the conceptual structure relevant to the sentence to be generated stored in the conceptual structure storage means, by taking the rules for sentence structure construction from the rule storage means, and applying these rules to this conceptual structure so as to desirably order the words of this modified conceptual structure.

12. A method of generating sentences, comprising the steps of:
   storing conceptual structures to be utilized as elements of sentences to be generated;
   storing rules to be followed in generating sentences; and
   generating sentences from the stored conceptual structures in accordance with the stored rules by utilizing sizes of partial structures of the conceptual structures specified by the stored rules to determine a sentence structure of each sentence to be generated.

13. The method of claim 12, wherein the sizes of partial structures are given in terms of numbers of nodes contained in the partial structures.

14. The method of claim 12, wherein the sizes of partial structures are given in terms of numbers of words contained in the partial structures.

15. The method of claim 12, wherein the sizes of partial structures are given in terms of numbers of letters contained in the partial structures.

16. The method of claim 12, wherein the sizes of partial structures are given in terms of numbers of syllables contained in the partial structures.

17. The method of claim 12, wherein the sizes of partial structures are given in terms of numbers of stressed syllables contained in the partial structures.

18. The method of claim 12, wherein the sizes of partial structures are given in terms of numbers of phonemes contained in the partial structures.

19. The method of claim 12, wherein the sentence structure to be determined is an appropriate form of expression for the sentence to be generated.

20. The method of claim 19, wherein the stored rules includes rules for individual concept, each rule being specifying condition of applicability and actions to be prosecuted on the conceptual structures, and wherein each sentence is generated, on a basis of the stored conceptual structure relevant to the sentence to be generated, by taking the rules for individual concept involved in this conceptual structure, finding one of the rules for which this conceptual structure satisfies the condition of applicability by determining the size of the partial structure specified in the rule and checking the condition of applicability specified in the rule, and applying this rule to this conceptual structure so as to desirably modify this conceptual structure by prosecuting the actions specified by this rule.

21. The method of claim 12, wherein the sentence structure to be determined is an appropriate order of words for the sentence to be generated.

22. The method of claim 21, wherein the stored rules includes rules for sentence structure construction specifying an order in which words of the conceptual structures are to be arranged, and wherein each sentence is generated, on a basis of the stored conceptual structure relevant to the sentence to be generated, by taking the rules for sentence structure construction, and applying these rules to this conceptual structure so as to desirably order the words of this conceptual structure.

* * * * *